(12) United States Patent
Ji et al.

(10) Patent No.: US 11,974,290 B2
(45) Date of Patent: Apr. 30, 2024

(54) PDCCH CANDIDATE ALLOCATION METHOD FOR CROSS-CARRIER SCHEDULING AND DEVICE

(71) Applicant: VIVO MOBILE COMMUNICATION CO., LTD., Guangdong (CN)

(72) Inventors: Zichao Ji, Chang'an Dongguan (CN); Yue Ma, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 652 days.

(21) Appl. No.: 17/129,433

(22) Filed: Dec. 21, 2020

(65) Prior Publication Data

US 2021/0112585 A1 Apr. 15, 2021

Related U.S. Application Data

(63) Continuation of application No. PCT/CN2019/089159, filed on May 30, 2019.

(30) Foreign Application Priority Data

Jun. 29, 2018 (CN) .......................... 201810699890.8

(51) Int. Cl.
*H04W 24/10* (2009.01)
*H04W 72/23* (2023.01)
(52) U.S. Cl.
CPC .................................. *H04W 72/23* (2023.01)
(58) Field of Classification Search
CPC ........... H04W 72/1289; H04W 72/042; H04W 24/08
See application file for complete search history.

(56) References Cited

U.S. PATENT DOCUMENTS

2013/0176952 A1* 7/2013 Shin ........................ H04L 5/001
 370/329
2013/0194956 A1 8/2013 Sartori
(Continued)

FOREIGN PATENT DOCUMENTS

CN 103891181 A 6/2014
CN 104067640 A 9/2014
(Continued)

OTHER PUBLICATIONS

Japanese Office Action dated Jul. 19, 2022 as received in application No. 2020-572745.
(Continued)

*Primary Examiner* — Zhiren Qin
(74) *Attorney, Agent, or Firm* — Price Heneveld LLP

(57) ABSTRACT

A PDCCH candidate allocation method for cross-carrier scheduling and a device are provided. This method includes: when configuration of a first cell includes search space set configuration or PDCCH candidate quantity configuration thereof, determining a PDCCH candidate quantity and/or a monitoring parameter thereof based on the configuration thereof; or when a first cell has no PDCCH configuration and configuration of a second cell includes only PDCCH configuration thereof, determining a PDCCH candidate quantity and/or a monitoring parameter of the first cell based on the PDCCH configuration of the second cell; or when a first cell has no PDCCH configuration and PDCCH configuration of a second cell includes search space set configuration or PDCCH candidate quantity configuration of the first cell, determining a PDCCH candidate quantity and/or a monitoring parameter of the first cell based on the search space set configuration or PDCCH candidate quantity configuration of the first cell.

17 Claims, 4 Drawing Sheets

(56) References Cited

U.S. PATENT DOCUMENTS

| | | | |
|---|---|---|---|
| 2014/0198748 A1 | 7/2014 | Lee | |
| 2014/0204813 A1 | 7/2014 | Yang | |
| 2015/0098367 A1* | 4/2015 | Park | H04L 1/1861 |
| | | | 370/278 |
| 2015/0295689 A1 | 10/2015 | Lee et al. | |
| 2015/0304086 A1* | 10/2015 | Kim | H04L 5/0098 |
| | | | 370/329 |
| 2017/0195999 A1* | 7/2017 | Feng | H04W 76/27 |
| 2017/0237539 A1* | 8/2017 | Xu | H04W 72/0446 |
| | | | 370/329 |
| 2017/0332393 A1* | 11/2017 | Lee | H04L 47/24 |
| 2019/0090267 A1* | 3/2019 | Li | H04W 16/14 |
| 2019/0215136 A1* | 7/2019 | Zhou | H04L 1/1819 |
| 2019/0246395 A1* | 8/2019 | Huang | H04W 72/12 |
| 2019/0357238 A1* | 11/2019 | Zhou | H04W 72/23 |

FOREIGN PATENT DOCUMENTS

| | | |
|---|---|---|
| CN | 104937865 A | 9/2015 |
| WO | 2013116388 A1 | 8/2013 |
| WO | 2014062041 A1 | 4/2014 |

OTHER PUBLICATIONS

"Remaining issues on NR CA and DC" 3GPP TSG RAN WG1 NR Ad Hoc Meeting #4 R1-1800021 Vancouver, Canada, Jan. 22-26, 2018, Huawei, HiSilicon.

Written Opinion and International Search Report dated Dec. 29, 2020 as received in application No. PCT/CN2019/089159.

Chinese Office Action dated Sep. 28, 2020 as received in application No. 201810699890.8.

"Remaining issues on control resource set and search space" 3GPP TSG RAN WG1 Meeting #92bis, Sanya, China, Apr. 16-Apr. 20, 2018, Qualcomm Incorporated.

Chinese Office Action dated Jun. 19, 2020 as received in application No. 201810699890.8.

MediaTek Inc., "Remaining Issues on Search Space," 3GPP TSG RAN WG1 Meeting #93, R1-1806779 pp. 1-5, (May 20, 2018).

Extended European Search Report dated Jul. 2, 2021 as received in Application No. 19827306.2.

IN Office Action in Application No. 202127003384 dated Jan. 11, 2022.

\* cited by examiner

PDCCH CANDIDATE ALLOCATION METHOD FOR CROSS-CARRIER SCHEDULING AND DEVICE

CROSS-REFERENCE TO RELATED APPLICATIONS

This application is a continuation application of PCT Application No. PCT/CN2019/089159 filed on May 30, 2019, which claims priority to Chinese Patent Application No. 201810699890.8, filed in China on Jun. 29, 2018, the disclosures of which are incorporated herein by reference in their entireties.

TECHNICAL FIELD

Embodiments of this disclosure relate to the field of communications technologies, and specifically, to a physical downlink control channel (PDCCH) candidate allocation method for cross-carrier scheduling and a device.

BACKGROUND

A fifth generation mobile communications technology (5G) new radio (NR) system supports configuration of a plurality of control resource sets (CORESET) and a plurality of search space sets for each component carrier (CC) or cell configured for user equipment (UE), and flexible configuration of a PDCCH candidate quantity (hereinafter referred to as a candidate quantity) for each search space set. In addition, NR also supports carrier aggregation (CA), but NR of the current release does not support PDCCH candidate allocation during cross-carrier scheduling in CA.

SUMMARY

According to a first aspect, a PDCCH candidate allocation method for cross-carrier scheduling is provided and applied to a network-side device or a terminal, where the method includes:
  when configuration of a first cell does not include PDCCH configuration and configuration of a second cell includes only PDCCH configuration of the second cell, determining a PDCCH candidate quantity and/or a monitoring parameter of the first cell based on the PDCCH configuration of the second cell; or
  when configuration of a first cell does not include PDCCH configuration and PDCCH configuration of a second cell includes search space set configuration or PDCCH candidate quantity configuration of the first cell, determining a PDCCH candidate quantity and/or a monitoring parameter of the first cell based on the search space set configuration or the PDCCH candidate quantity configuration of the first cell; or
  when configuration of a first cell includes search space set configuration or PDCCH candidate quantity configuration of the first cell, determining a PDCCH candidate quantity and/or a monitoring parameter of the first cell based on the configuration of the first cell;
  where
  the first cell is a cell that is cross-carrier scheduled by the second cell.

According to a second aspect, a first device is further provided, including:
  a first determining module, configured to: when configuration of a first cell does not include PDCCH configuration and configuration of a second cell includes only PDCCH configuration of the second cell, determine a PDCCH candidate quantity and/or a monitoring parameter of the first cell based on the PDCCH configuration of the second cell;
  a second determining module, configured to: when configuration of a first cell does not include PDCCH configuration and PDCCH configuration of a second cell includes search space set configuration or PDCCH candidate quantity configuration of the first cell, determine a PDCCH candidate quantity and/or a monitoring parameter of the first cell based on the search space set configuration or the PDCCH candidate quantity configuration of the first cell; and/or
  a third determining module, configured to: when configuration of a first cell includes search space set configuration or PDCCH candidate quantity configuration of the first cell, determine a PDCCH candidate quantity and/or a monitoring parameter of the first cell based on the configuration of the first cell;
  where
  the first cell is a cell that is cross-carrier scheduled by the second cell.

According to a third aspect, a terminal is further provided and includes a processor, a memory, and a computer program that is stored in the memory and capable of running on the processor, where when the computer program is executed by the processor, the steps of the PDCCH candidate allocation method for cross-carrier scheduling according to the first aspect are implemented.

According to a fourth aspect, a network-side device is further provided and includes a processor, a memory, and a computer program that is stored in the memory and capable of running on the processor, where when the computer program is executed by the processor, the steps of the PDCCH candidate allocation method for cross-carrier scheduling according to the first aspect are implemented.

According to a fifth aspect, a computer-readable storage medium is further provided, where the computer-readable storage medium stores a computer program, and when the computer program is executed by a processor, the steps of the PDCCH candidate allocation method for cross-carrier scheduling according to the first aspect are implemented.

BRIEF DESCRIPTION OF DRAWINGS

Other advantages and benefits become apparent to persons of ordinary skill in the art by reading detailed description of the implementations below. The accompanying drawings are merely intended to for the purpose of illustrating the implementations and are not intended to limit this disclosure. Throughout the accompanying drawings, the same reference numerals represent the same components. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. Based on the embodiments of this disclosure, all other embodiments derived by persons of ordinary skill in the art without creative efforts fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates that the following three cases: only A is included, only B is included, or both A and B are included.

In the embodiments of this disclosure, the terms such as "example" or "for example" are used to represent an example, an illustration, or a description. Any embodiment or design scheme described by "example" or "for example" in the embodiments of this disclosure should not be explained as being more preferred or more advantageous than other embodiments or design schemes. To be precise, the terms such as "example" or "for example" are intended to present a related concept in a specific manner.

Figure 1:
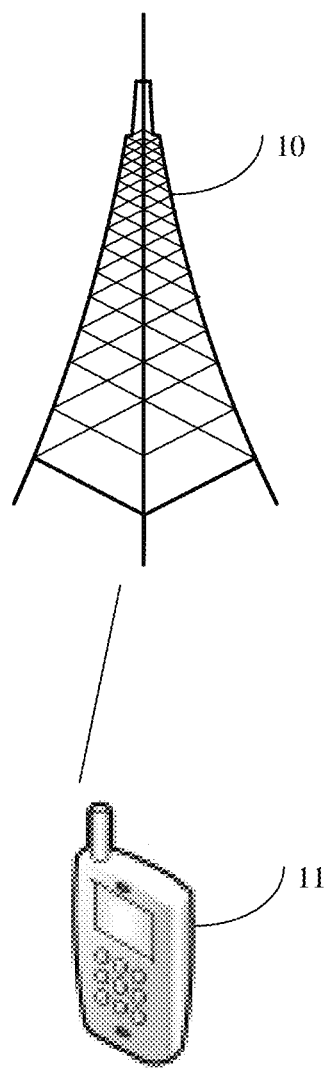
FIG. 1 is a schematic architectural diagram of a wireless communications system according to an embodiment of this disclosure.

The following describes the embodiments of this disclosure with reference to the accompanying drawings. A PDCCH candidate allocation method for cross-carrier scheduling and a device that are provided in the embodiments of this disclosure may be applied to a wireless communications system. The wireless communications system may be an evolved long term evolution (eLTE) system, or a 5G system, or a subsequent evolved communications system. FIG. 1 is a schematic architectural diagram of a wireless communications system according to an embodiment of this disclosure. As shown in FIG. 1, the wireless communications system may include a network-side device 10 and a terminal (or referred to as UE) 11. The terminal 11 may communicate with the network-side device 10. In an actual application, a connection between the foregoing devices may be a wireless connection. To conveniently and visually represent a connection relationship between the devices, a solid line is used in FIG. 1.

It should be noted that the foregoing communications system may include a plurality of terminals, and the network-side device may communicate with the plurality of terminals (transmitting signaling or transmitting data).

The network-side device provided in this embodiment of this disclosure may be a base station. The network-side device may be a commonly used base station, may be a base transceiver station (BTS) in global system for mobile communications (GSM) or code division multiple access (CDMA), may be a NodeB in wideband code division multiple access (WCDMA), or may be an evolved NodeB (eNB or e-NodeB) in long term evolution (LTE) or a next generation NodeB (gNB). This is not limited in the embodiments of this disclosure.

The terminal provided in this embodiment of this disclosure may be a mobile phone, a tablet computer, a notebook computer, an ultra-mobile personal computer (UMPC), a netbook, a personal digital assistant (PDA), or the like.

Figure 2:
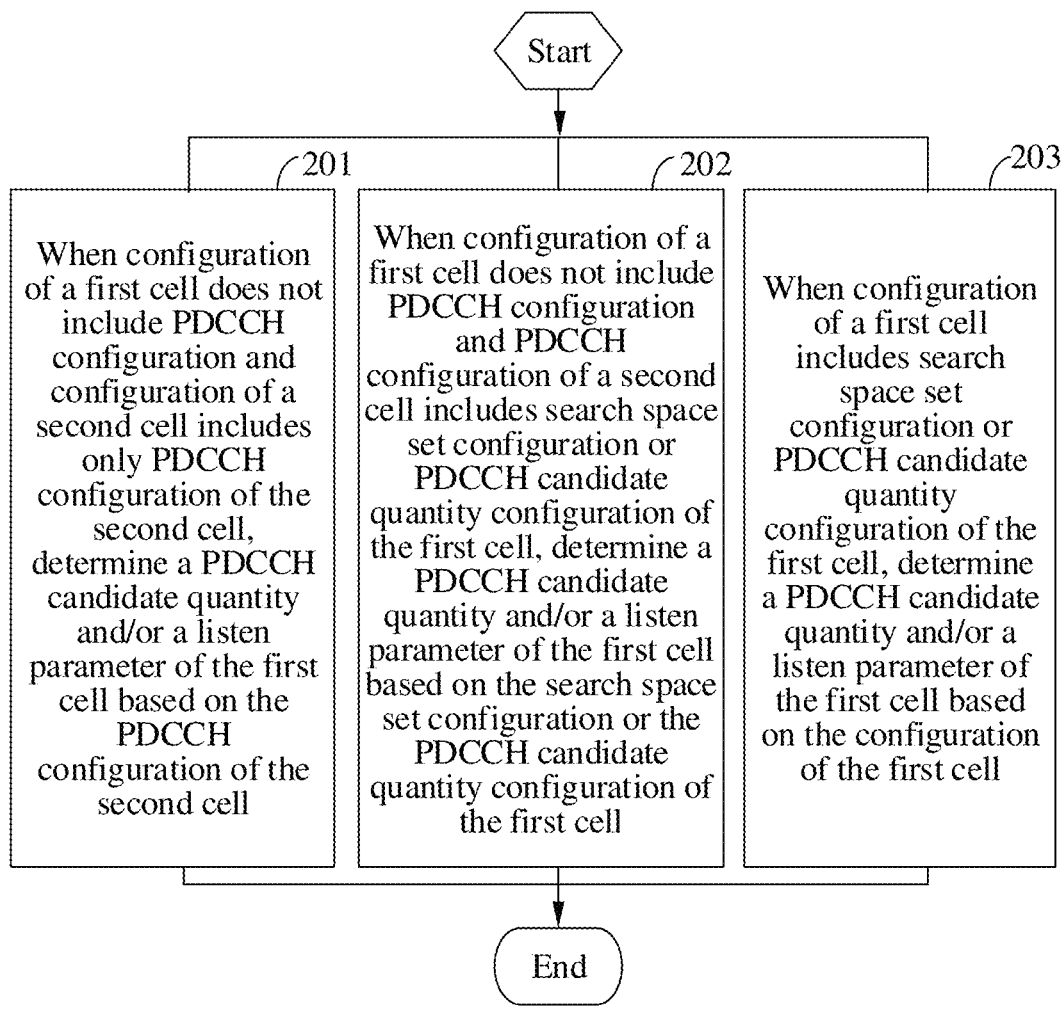
FIG. 2 is a flowchart of a PDCCH candidate allocation method for cross-carrier scheduling according to an embodiment of this disclosure.

FIG. 2 shows a procedure of a PDCCH candidate allocation method for cross-carrier scheduling according to an embodiment of this disclosure. The method may be performed by a network-side device or a terminal. Specific steps are as follows.

Step 201: When configuration of a first cell does not include PDCCH configuration and configuration of a second cell includes only PDCCH configuration of the second cell, determine a PDCCH candidate quantity and/or a monitoring parameter of the first cell based on the PDCCH configuration of the second cell.

It should be noted that the monitoring parameter of the first cell may include a monitoring period, a monitoring location, and/or the like. Configuration of different monitoring periods and/or monitoring locations for first cells (scheduled cells) may reduce unnecessary blind detection by the terminal, thereby saving power.

Step 202: When configuration of a first cell does not include PDCCH configuration and PDCCH configuration of a second cell includes search space set configuration or PDCCH candidate quantity configuration of the first cell, determine a PDCCH candidate quantity and/or a monitoring parameter of the first cell based on the search space set configuration or the PDCCH candidate quantity configuration of the first cell.

Step 203: When configuration of a first cell includes search space set configuration or PDCCH candidate quantity configuration of the first cell, determine a PDCCH candidate quantity and/or a monitoring parameter of the first cell based on the configuration of the first cell.

The first cell is a cell that is cross-carrier scheduled by the second cell. For example, the second cell is a primary cell, and the first cell is a secondary cell. It should be noted that the first cell may also be referred to as a scheduled cell, and the second cell may also be referred to as a scheduling cell. Certainly, it can be understood that specific names thereof are not limited in this embodiment of this disclosure.

It should be noted that a sequence of steps 201, 202, and 203 is not limited in this embodiment of this disclosure. For example, any one of steps 201, 202, and 203 may be performed.

In this embodiment of this disclosure, a configuration mode of the network-side device or the terminal may be any of the following:

configuration mode 1: the configuration of the first cell does not include the PDCCH configuration, and the configuration of the second cell includes only the PDCCH configuration of the second cell;

configuration mode 2: the configuration of the first cell does not include the PDCCH configuration, and the PDCCH configuration of the second cell includes the search space set configuration or the PDCCH candidate quantity configuration of the first cell; and configuration mode 3: PDCCH configuration of the first cell includes the search space set configuration or the PDCCH candidate quantity configuration.

It can be understood that, in the configuration mode 1, the search space set configuration or the PDCCH candidate quantity configuration of the first cell is not explicitly configured, and the network-side device or the terminal may determine the PDCCH candidate quantity and/or the monitoring parameter of the first cell based on the PDCCH configuration of the second cell by using a rule or a formula; in the configuration mode 2, the PDCCH configuration of the second cell explicitly includes the search space set configuration or the PDCCH candidate quantity configuration of the first cell, and the network-side device or the terminal may determine the PDCCH candidate quantity and/or the monitoring parameter of the first cell based on the search space set configuration or the PDCCH candidate quantity configuration of the first cell; in the configuration mode 3, the network-side device or the terminal may determine the PDCCH candidate quantity and/or the monitoring parameter of the first cell directly based on the search space set configuration or the PDCCH candidate quantity configuration included in the PDCCH configuration of the first cell.

In this embodiment of this disclosure, the network-side device may configure a quantity of PDCCH candidates in a bandwidth part (BWP) of the scheduling cell for the terminal by using radio resource control (RRC). The BWP includes one or more CORESETs and search space sets, where the search space set includes a PDCCH candidate quantity of each aggregation level (AL). In addition, the network-side device may further configure, by using RRC, one or more scheduled cells that are cross-carrier scheduled by the scheduling cell.

In an embodiment of this disclosure, when the configuration of the first cell does not include the PDCCH configuration and the configuration of the second cell includes only the PDCCH configuration of the second cell, the network-side device or the terminal may determine, based on a PDCCH candidate quantity configured for the second cell, a PDCCH candidate quantity to be allocated to each first cell.

Allocation manner 1: allocating the PDCCH candidate quantity configured for the second cell to all first cells.

Optionally, in the allocation manner 1, the PDCCH candidate quantity to be allocated to each first cell is determined through equal allocation based on the PDCCH candidate quantity configured for the second cell, that is, each first cell is allocated a same PDCCH candidate quantity from the PDCCH candidate quantity configured for the second cell; or in the allocation manner 1, the PDCCH candidate quantity to be allocated to each first cell is determined based on the PDCCH candidate quantity configured for the second cell and a first factor of each first cell, where the first factor may be determined based on one or more of the following items: a cell identity (ID) of the first cell, an SCS configured for an active BWP of the first cell, and bandwidth of the first cell.

In other words, the PDCCH candidate quantity configured for the second cell is equally allocated among all the first cells; or the first factor (or referred to as a factor of proportionality) is calculated based on items such as the cell ID of the first cell, the SCS configured for the active BWP of the first cell, or the bandwidth of the first cell, and then the PDCCH candidate quantity configured for the second cell is allocated among all the first cells based on the first factor (or referred to as a factor of proportionality). It should be noted that, for an example description of the allocation manner 1, reference may be made to the following example 1.

Allocation manner 2: determining, based on the PDCCH candidate quantity configured for the second cell, a PDCCH candidate quantity to be allocated to each aggregation level AL of each first cell.

Optionally, in the allocation manner 2, the PDCCH candidate quantity to be allocated to each first cell may be the same as the PDCCH candidate quantity configured for the second cell. It should be noted that, for an example description of the allocation manner 2, reference may be made to the following example 2.

Optionally, in the allocation manner 2, the PDCCH candidate quantity to be allocated to each first cell is the same as a quantity in a subset of the PDCCH candidate quantity configured for the second cell.

For example, the subset of the PDCCH candidate quantity configured for the second cell may include any of the following items:

(1) a quantity of PDCCH candidates configured for the second cell and used to monitor or perform blind detection for a specific search space set type (for example, UE-specific search space);

(2) a quantity of PDCCH candidates configured for the second cell and used to monitor or perform blind detection for a specific DCI format (for example, a DCI format 0-1 or a DCI format 1-1); and (3) a quantity of PDCCH candidates that are configured for the second cell and that are of one or more search space sets, for example, a search space set corresponding to one or more configured or predefined search space IDs, or a search space set corresponding to one or more smallest search space IDs.

Optionally, in the allocation manner 2, the PDCCH candidate quantity to be allocated to each first cell is determined based on the PDCCH candidate quantity configured for the second cell and a second factor.

It can be understood that the PDCCH candidate quantity to be allocated to each first cell may be determined by using a specific rule or a specific formula.

For example, the PDCCH candidate quantity to be allocated to each first cell is equal to a product of the PDCCH candidate quantity configured for the second cell and the second factor. Further, the PDCCH candidate quantity to be allocated to each first cell is equal to a number obtained by rounding down the product of the PDCCH candidate quantity configured for the second cell and the second factor. For example:

PDCCH candidate quantity to be allocated to each first cell=floor{PDCCH candidate quantity configured for the second cell×Second factor}

The second factor may be corresponding to a relationship between a cell parameter of the first cell and a cell parameter of the second cell. For example, the second factor may be related to any of the following items: a relationship between a subcarrier spacing (SCS) of the first cell and an SCS of the second cell, and a relationship between an SCS of the first cell and another parameter (which may be a cell parameter other than an SCS) of the second cell.

In this embodiment of this disclosure, optionally, the second factor may be calculated by using the following formula:

$$2^{\mu_{scheduled}}/2^{\mu_{scheduling}}, \quad \text{formula 1}$$

$2^{\mu_{scheduled}}$ is related to the SCS of the second cell, $2^{\mu_{scheduling}}$ is related to the SCS of the first cell, and $\mu$ is protocol-defined SCS configuration.

TABLE 1 relationships between $\mu$ and SCS

| $\mu$ | $\Delta f = 2^{\mu} \cdot 15[kHz]$ |
|---|---|
| 0 | 15 |
| 1 | 30 |
| 2 | 60 |
| 3 | 120 |
| 4 | 240 |

That the SCS (SCS of an active BWP) of the first cell is 30 kHz and the SCS (SCS of an active BWP) of the second cell is 15 kHz is used as an example. According to Table 1, $2^{\mu_{scheduled}}$ is $2^0$, and $2^{\mu_{scheduling}}$ is $2^1$. The second factor determined based on the relationship between the SCS of the first cell and the SCS of the second cell is $2^0/2^1=0.5$.

Optionally, a condition for the allocation manners in step 201 to take effect may be that a search space set of the second cell is configured to monitor or perform blind detection for DCI in a first downlink control information (DCI) format. The first DCI format includes a carrier indicator field.

For example, the first DCI format is a DCI format 0-1 or a DCI format 1-1. Therefore, the allocation manners in step 201 take effect only when the search space set of the second cell is configured to monitor or perform blind detection for the DCI format 0-1 or the DCI format 1-1. In an embodiment of this disclosure, when the configuration of the first cell does not include the PDCCH configuration and the PDCCH configuration of the second cell includes the search space set configuration or the PDCCH candidate quantity configuration of the first cell, that is, for the foregoing configuration mode 2, the PDCCH configuration of the second cell may indicate a PDCCH candidate quantity and/or a monitoring parameter of each AL of each first cell.

For example, the PDCCH configuration of the second cell includes a search space set independently configured for each first cell (or referred to as a scheduled cell), and the search space set includes a cell identity of an associated first cell, for example, a carrier indicator field (CIF) value or a cell ID. It should be noted that, for an example description, reference may be made to the following example 4.

In an embodiment of this disclosure, when the configuration of the first cell does not include the PDCCH configuration and the PDCCH configuration of the second cell includes the search space set configuration or the PDCCH candidate quantity configuration of the first cell, that is, for the foregoing configuration mode 2, each search space set configuration of the first cell in the PDCCH configuration of the second cell indicates one or more of the following items: (1) a PDCCH candidate quantity and/or a monitoring parameter allocated to the second cell; and (2) a PDCCH candidate quantity and/or a monitoring parameter allocated to each AL of each first cell associated with the search space set.

Optionally, the search space set may be configured to monitor or perform blind detection for DCI in a second DCI format. The second DCI format includes a carrier indicator field. For example, the second DCI format is a DCI format 0-1 or a DCI format 1-1.

Optionally, search space set configuration may include one or more sets or lists. Each item in the set or the list is corresponding to one or more of the first cells. Each item in the set or the list includes one or more of the following items: a cell identity (for example, a CIF value or a cell ID) of the first cell or the second cell, a PDCCH candidate quantity of each AL of the first cell or the second cell, and a monitoring parameter of the first cell or the second cell. It should be noted that, for an example description, reference may be made to the following example 5 and example 6.

In an embodiment of this disclosure, when the PDCCH configuration of the first cell includes the search space set configuration or the PDCCH candidate quantity configuration, that is, for the configuration mode 3, optionally, the search space set configuration or the PDCCH candidate quantity configuration of the first cell may be used to indicate one or more of the following items:
 (a) PDCCH search space set configuration or a PDCCH candidate quantity allocated to the first cell from a CORESET of the second cell; and
 (b) a relationship (for example, an association relationship or a mapping relationship) between a search space set of the first cell and a CORESET or a search space set of the corresponding second cell.

It should be noted that, optionally, a condition for an allocation manner in step 203 to take effect is that a search space set of the second cell is configured to monitor or perform blind detection for DCI in a third DCI format. The third DCI format includes a carrier indicator field. For example, the third DCI format may be a DCI format 0-1 or a DCI format 1-1.

In an embodiment of this disclosure, optionally, the search space set configuration or the PDCCH candidate quantity configuration of the first cell is applied to some or all CORESETs or search space sets in an active BWP of the second cell.

It can be understood that the search space set configuration or the PDCCH candidate quantity configuration of the first cell may be applied to the some or all CORESETs or search space sets in the active BWP of the second cell by using a preset association relationship or calculation relationship.

For example, a search space set of the first cell (scheduled cell) is mapped to a search space set of the second cell (scheduling cell) with a same identity (ID). A mapping relationship may be an explicitly configured mapping relationship, or may be an implicit mapping relationship. The implicit mapping relationship may be deduced by using a rule or a formula, for example, sorting and mapping by ID in a BWP.

For another example, the candidate quantity configured for the first cell (scheduled cell) is enabled to take effect in each search space set or a third-DCI-format search space set in each BWP of the second cell (scheduling cell).

In an embodiment of this disclosure, optionally, that the search space set configuration or the PDCCH candidate quantity configuration of the first cell is applied to some or all CORESETs or search space sets in an active BWP of the second cell includes any of the following items.

(a) Search space set configuration or PDCCH candidate quantity configuration of each AL included in cross-carrier scheduling configuration of the first cell is applied to some or all CORESETs or search space sets in a BWP of the second cell. That is, the search space set configuration or the PDCCH candidate quantity configuration of each AL included in the cross-carrier scheduling configuration of the first cell takes effect in the some or all CORESETs or search space sets in the BWP of the second cell. It should be noted that, for an example description, reference may be made to the following example 7.

(b) Search space set configuration or PDCCH candidate quantity configuration of each AL included in serving cell configuration of the first cell is applied to some or all CORESETs or search space sets in a BWP of the second cell. That is, the search space set configuration or the PDCCH candidate quantity configuration of each AL included in the serving cell configuration of the first cell takes effect in the some or all CORESETs or search space sets in the BWP of the second cell. It should be noted that, for an example description, reference may be made to the following example 8.

In an embodiment of this disclosure, optionally, BWP configuration of the first cell includes the search space set configuration of the first cell or PDCCH candidate quantity configuration of each AL of the first cell, and/or a correspondence (association relationship or mapping relationship) between CORESETs or search space sets of the first cell and CORESETs or search space sets of the second cell. That is, the BWP configuration of the first cell includes the search space set configuration or the PDCCH candidate quantity configuration of each AL, and includes the association relationship or the mapping relationship with the CORESETs or the search space sets of the corresponding second cell. It should be noted that, for an example description, reference may be made to the following example 9.

In the embodiments of this disclosure, quantities of PDCCH candidates of a plurality of cells (including a scheduling cell and a scheduled cell) may be properly allocated within one search space set or among a plurality of search space sets, to make full use of a processing capability of the terminal, maximize control resource allocation, and reduce a probability of control channel allocation blocking while ensuring that the processing capability of the terminal is not exceeded, reducing unnecessary blind PDCCH detection by the terminal, and reducing energy consumption of the terminal.

Example 1

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). The network-side device configures cell IDs, indexes, CIF values, or the like of the cell A and cell B for the UE.

In this example, the network-side device configures a PDCCH in a BWP of the cell A. An active BWP includes one CORESET and one associated search space set. PDCCH candidate quantities of ALs {1, 2, 4, 8, 16} of the search space set are {4, 4, 2, 2, 0}, respectively. Cell B configuration does not include PDCCH configuration.

In this example, when the UE performs blind detection in the search space set in the BWP of the cell A, actual PDCCH candidate quantities are calculated in a manner of equal allocation between cells. PDCCH candidate quantities of the cell A are {2, 2, 1, 1, 0}, and PDCCH candidate quantities of the cell B are {2, 2, 1, 1, 0}. Therefore, total PDCCH candidate quantities are {4, 4, 2, 2, 0}. The UE performs the blind detection based on the actual PDCCH candidate quantities {4, 4, 2, 2, 0}.

Example 2

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). The network-side device configures cell IDs, indexes, CIF values, or the like of the cells A and B for the UE.

In this example, the network-side device configures a PDCCH in a BWP of the cell A (scheduling cell). An active BWP includes one CORESET and one associated search space set. PDCCH candidate quantities of ALs {1, 2, 4, 8, 16} of the search space set are {4, 4, 2, 2, 0}, respectively. Cell B configuration does not include PDCCH configuration.

In this example, when the UE performs blind detection in the search space set in the BWP of the cell A, the UE performs the blind detection based on actual PDCCH candidate quantities: {4, 4, 2, 2, 0}×2 (a total quantity of actually scheduled cells)={8, 8, 4, 4, 0}.

Example 3

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). The network-side device configures cell IDs, indexes, CIF values, or the like of the cell A and cell B for the UE.

In this example, the network-side device configures a PDCCH in a BWP of the cell A (scheduling cell). An active BWP includes one CORESET and one associated search space set. PDCCH candidate quantities of ALs {1, 2, 4, 8, 16} of the search space set are {4, 4, 2, 2, 0}, respectively. Cell B configuration does not include PDCCH configuration.

For example, an SCS of the active BWP of the cell A is 30 kHz, and an SCS of the active BWP of the cell B is 15 kHz.

In this example, when the UE performs blind detection in the search space set in the BWP of the cell A, actual PDCCH candidate quantities are calculated. PDCCH candidate quantities of the cell A are {4, 4, 2, 2, 0}, and PDCCH candidate quantities of the cell B are floor{F}. With reference to the foregoing formula 1 and Table 1, F={4, 4, 2, 2, 0}×factor={4, 4, 2, 2, 0}×$2^{\mu_B}/2^{\mu_A}$={4, 4, 2, 2, 0}×$2^0/2^1$={2, 2, 1, 1, 0}. Therefore, total PDCCH candidate quantities are {6, 6, 3, 3, 0}. The UE performs the blind detection based on the actual PDCCH candidate quantities {6, 6, 3, 3, 0}.

Example 4

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). Cell B configuration does not include PDCCH configuration. The network-side device configures cell IDs, indexes, CIF values, or the like of the cell A and cell B for the UE.

In this example, the network-side device configures a PDCCH in a BWP of the cell A (scheduling cell). An active BWP includes one CORESET and two associated search space sets. One search space set is corresponding to the cell A, and the other search space set is corresponding to the cell B. PDCCH configuration of the cell A includes an identity (for example, a CIF value or a cell ID) of a corresponding cell (the scheduled cell, that is, the cell B), and PDCCH candidate quantity configuration and/or search space set configuration of the cell B. The PDCCH candidate quantity configuration includes PDCCH candidate quantities corresponding to ALs {1, 2, 4, 8, 16}. PDCCH candidate quantities allocated to the cell A are {4, 4, 2, 2, 1}, and PDCCH candidate quantities allocated to the cell B are {2, 2, 2, 2, 0}.

In this example, when the UE performs blind detection in the search space set in the BWP of the cell A, the UE performs the blind detection based on actual PDCCH candidate quantities: {4, 4, 2, 2, 1}+{2, 2, 2, 2, 0}={6, 6, 4, 4, 1}.

Example 5

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). Cell B configuration does not include PDCCH configuration. The network-side device configures cell IDs, indexes, CIF values, or the like of the cells A and B for the UE.

In this example, the network-side device configures a PDCCH in a BWP of the cell A (scheduling cell). An active BWP includes one CORESET and one associated search space set. Search space set configuration includes configuration of one set or list. The set or list configuration includes CIF values or cell IDs, PDCCH candidate quantity configuration, and search space set configuration that are of the cell A and the cell B. PDCCH candidate quantities of ALs {1, 2, 4, 8, 16} of the search space set are {4, 4, 2, 2, 1}, respectively.

In this example, when the UE performs blind detection in the search space set in the BWP of the cell A, the UE performs the blind detection based on actual PDCCH candidate quantities: {4, 4, 2, 2, 1}+{4, 4, 2, 2, 1}={8, 8, 4, 4, 2}.

Example 6

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). Cell B configuration does not include PDCCH configuration. The network-side device configures cell IDs, indexes, CIF values, or the like of the cells A and B for the UE.

In this example, the network-side device configures a PDCCH in a BWP of the cell A (scheduling cell). An active BWP includes one CORESET and one associated search space set. The search space set includes two sets of PDCCH candidate quantity configuration. One set is allocated to the cell A, and the other set is allocated to the cell B. Each set of PDCCH candidate quantity configuration includes PDCCH candidate quantities corresponding to ALs {1, 2, 4, 8, 16}, where PDCCH candidate quantities allocated to the cell A are {4, 4, 2, 2, 1}, and PDCCH candidate quantities allocated to the cell B are {2, 2, 2, 2, 0}.

In this example, when the UE performs blind detection in the search space set in the BWP of the cell A, the UE performs the blind detection based on actual PDCCH candidate quantities: {4, 4, 2, 2, 1}+{2, 2, 2, 2, 0}={6, 6, 4, 4, 1}.

Example 7

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). The network-side device configures cell IDs, indexes, CIF values, or the like of the cells A and B for the UE.

In this example, the network-side device configures a PDCCH in a BWP of the cell A (scheduling cell). An active BWP includes one CORESET and one associated search space set. PDCCH candidate quantities of ALs {1, 2, 4, 8, 16} of the search space set are {4, 4, 2, 2, 0}, respectively.

In this example, the network-side device configures cross-carrier scheduling configuration for the scheduled cell B. The cross-carrier scheduling configuration includes search space set configuration. PDCCH candidate quantities of ALs {1, 2, 4, 8, 16} of the search space set are {2, 2, 2, 2, 1}, respectively.

In this example, when the UE performs blind detection in the search space set in the BWP of the cell A, the UE performs the blind detection based on actual PDCCH candidate quantities: {4, 4, 2, 2, 0}+{2, 2, 2, 2, 1}={6, 6, 4, 4, 1}.

Example 8

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). The network-side device configures cell IDs, indexes, CIF values, or the like of the cells A and B for the UE.

In this example, the network-side device configures a PDCCH in a BWP of the cell A (scheduling cell). An active BWP includes one CORESET and one associated search space set. PDCCH candidate quantities of ALs {1, 2, 4, 8, 16} of the search space set are {4, 4, 2, 2, 0}, respectively.

In this example, the network-side device configures serving cell configuration for the scheduled cell B. The serving cell configuration includes search space set configuration, and a search space set corresponding to the search space set configuration is actually associated with a CORESET in the BWP of the cell A. PDCCH candidate quantities of ALs {1, 2, 4, 8, 16} of the search space set are {2, 2, 2, 2, 1}, respectively.

In this example, when the UE performs blind detection in the search space set in the BWP of the cell A, the UE performs the blind detection based on actual PDCCH candidate quantities: {4, 4, 2, 2, 0}+{2, 2, 2, 2, 1}={6, 6, 4, 4, 1}.

Example 9

In this example, a network-side device configures two cells, namely, cell A and cell B, for UE by using RRC. The cell A is a primary cell, the cell B is a secondary cell, and the cell A (also referred to as a scheduling cell or second cell) cross-carrier schedules the cell B (also referred to as a scheduled cell or first cell). The network-side device configures cell IDs, indexes, CIF values, or the like of the cells A and B for the UE.

In this example, the network-side device configures a PDCCH in a BWP of the cell A (scheduling cell). An active BWP includes one CORESET and one associated search space set. PDCCH candidate quantities of ALs {1, 2, 4, 8, 16} of the search space set are {4, 4, 2, 2, 0}, respectively.

In this example, the network-side device configures BWP configuration for the scheduled cell B. The BWP configuration includes search space set configuration, and a search space set corresponding to the search space set configuration is actually associated with a CORESET in the BWP of the cell A. PDCCH candidate quantities of ALs {1, 2, 4, 8, 16} of the search space set are {2, 2, 2, 2, 1}, respectively.

In this example, when the UE performs blind detection in the search space set in the BWP of the cell A, the UE performs the blind detection based on actual PDCCH candidate quantities: {4, 4, 2, 2, 0}+{2, 2, 2, 2, 1}={6, 6, 4, 4, 1}.

An embodiment of this disclosure further provides a first device. Because a problem solving principle of the first device is similar to the PDCCH candidate allocation method for cross-carrier scheduling in the embodiments of this disclosure, refer to the implementation of the method for an implementation of the first device. Details are not described herein again.

Figure 3:
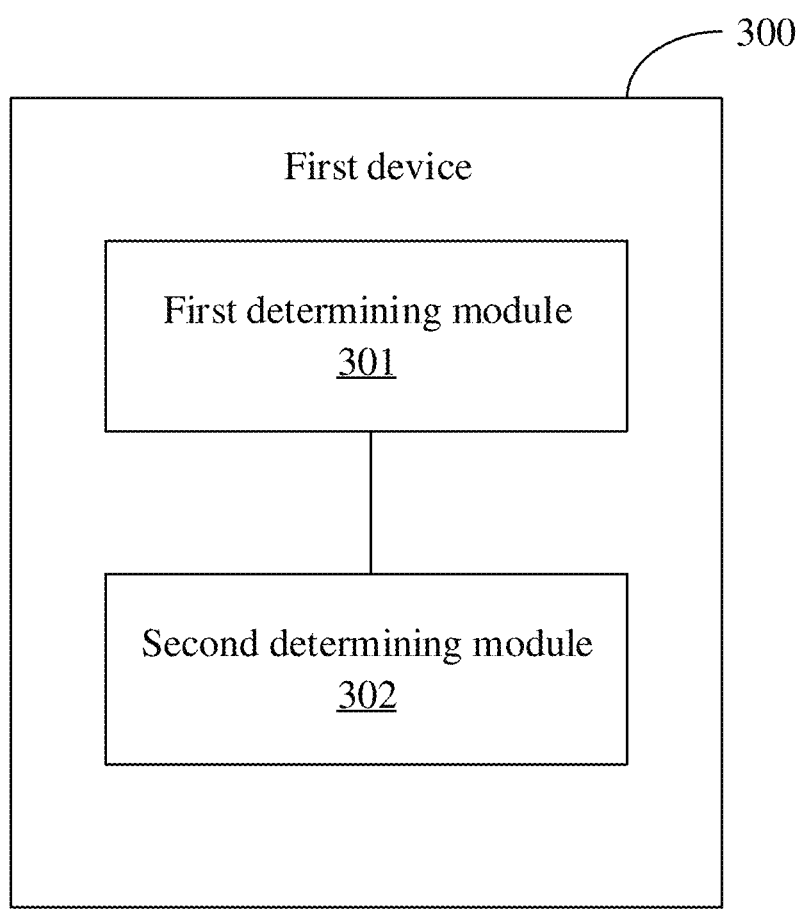
FIG. 3 is a first schematic structural diagram of a first device according to an embodiment of this disclosure.

Referring to FIG. 3, an embodiment of this disclosure further provides a first device. The first device 300 includes:

- a first determining module 301, configured to: when configuration of a first cell does not include PDCCH configuration and configuration of a second cell includes only PDCCH configuration of the second cell, determine a PDCCH candidate quantity and/or a monitoring parameter of the first cell based on the PDCCH configuration of the second cell, where it should be noted that the monitoring parameter of the first cell may include a monitoring period, a monitoring location, and/or the like, and configuration of different monitoring periods and/or monitoring locations for first cells (scheduled cells) may reduce unnecessary blind detection by a terminal, thereby saving power;
- a second determining module 302, configured to: when configuration of a first cell does not include PDCCH configuration and PDCCH configuration of a second cell includes search space set configuration or PDCCH candidate quantity configuration of the first cell, determine a PDCCH candidate quantity and/or a monitoring parameter of the first cell based on the search space set configuration or the PDCCH candidate quantity configuration of the first cell; and/or
- a third determining module 303, configured to: when configuration of a first cell includes search space set configuration or PDCCH candidate quantity configuration of the first cell, determine a PDCCH candidate quantity and/or a monitoring parameter of the first cell based on the configuration of the first cell;

where the first cell is a cell that is cross-carrier scheduled by the second cell.

In an embodiment of this disclosure, optionally, the first determining module 301 is further configured to:

when a search space set of the second cell is configured to monitor or perform blind detection for a first downlink control information DCI format, determine, based on a PDCCH candidate quantity configured for the second cell, a PDCCH candidate quantity to be allocated to each first cell, where the first DCI format includes a carrier indicator field.

In an embodiment of this disclosure, optionally, the first determining module 301 is further configured to: determine, through equal allocation based on the PDCCH candidate quantity configured for the second cell, the PDCCH candidate quantity to be allocated to each first cell; or determine, based on the PDCCH candidate quantity configured for the second cell and a first factor of each first cell, the PDCCH candidate quantity to be allocated to each first cell.

The first factor is determined based on one or more of the following items:

- a cell identity of the first cell;
- a subcarrier spacing SCS configured for an active bandwidth part BWP of the first cell; and
- bandwidth of the first cell.

In an embodiment of this disclosure, optionally, the PDCCH candidate quantity to be allocated to each first cell is the same as the PDCCH candidate quantity configured for the second cell; or the PDCCH candidate quantity to be allocated to each first cell is the same as a quantity in a subset of the PDCCH candidate quantity configured for the second cell; or the PDCCH candidate quantity to be allocated to each first cell is determined based on the PDCCH candidate quantity configured for the second cell and a second factor.

The second factor is corresponding to a relationship between a cell parameter of the first cell and a cell parameter of the second cell. For example, the second factor is related to any of the following items: a relationship between an SCS of the first cell and an SCS of the second cell, and a relationship between an SCS of the first cell and another parameter of the second cell.

In an embodiment of this disclosure, optionally, the subset of the PDCCH candidate quantity configured for the second cell includes any of the following items: a quantity of PDCCH candidates configured for the second cell and used to monitor or perform blind detection for a specific search space set type, a quantity of PDCCH candidates configured for the second cell and used to monitor or perform blind detection for a specific DCI format, and a quantity of PDCCH candidates that are configured for the second cell and that are of one or more search space sets.

In an embodiment of this disclosure, optionally, when the configuration of the first cell does not include the PDCCH configuration and the PDCCH configuration of the second cell includes the search space set configuration or the PDCCH candidate quantity configuration of the first cell, the PDCCH configuration of the second cell indicates a PDCCH candidate quantity and/or a monitoring parameter of each AL of each first cell; or each search space set configuration of the first cell in the PDCCH configuration of the second cell indicates one or more of the following items: a PDCCH candidate quantity and/or a monitoring parameter allocated to the second cell, and a PDCCH candidate quantity and/or a monitoring parameter allocated to each AL of each first cell associated with a search space set.

In an embodiment of this disclosure, optionally, the search space set is configured to monitor or perform blind detection for DCI in a second DCI format, where the second DCI format includes a carrier indicator field.

In an embodiment of this disclosure, optionally, the search space set configuration of the first cell includes one or more of the following items: a cell identity of the first cell or the second cell, a PDCCH candidate quantity of each AL of the first cell or the second cell, and a monitoring parameter of the first cell or the second cell.

In an embodiment of this disclosure, optionally, when the configuration of the first cell includes the search space set configuration or the PDCCH candidate quantity configuration of the first cell, the search space set configuration or the PDCCH candidate quantity configuration of the first cell is used to indicate one or more of the following items: PDCCH search space set configuration or a PDCCH candidate quantity allocated to the first cell from a CORESET of the second cell, and a relationship between a search space set of the first cell and a CORESET or a search space set of the second cell.

In an embodiment of this disclosure, optionally, the third determining module 303 is further configured to: when a search space set of the second cell is configured to monitor or perform blind detection for a third DCI format, determine the PDCCH candidate quantity and/or the monitoring parameter of the first cell based on PDCCH configuration of the first cell, where the third DCI format includes a carrier indicator field.

In an embodiment of this disclosure, optionally, the search space set configuration or the PDCCH candidate quantity configuration of the first cell is applied to some or all CORESETs or search space sets in an active BWP of the second cell.

In an embodiment of this disclosure, optionally, that the search space set configuration or the PDCCH candidate quantity configuration of the first cell is applied to some or all CORESETs or search space sets in an active BWP of the second cell includes any of the following items: search space set configuration or PDCCH candidate quantity configuration of each AL included in cross-carrier scheduling configuration of the first cell is applied to some or all CORESETs or search space sets in a BWP of the second cell, and search space set configuration or PDCCH candidate quantity configuration of each AL included in serving cell configuration of the first cell is applied to some or all CORESETs or search space sets in a BWP of the second cell.

In an embodiment of this disclosure, optionally, BWP configuration of the first cell includes the search space set configuration of the first cell or PDCCH candidate quantity configuration of each AL of the first cell, and/or a correspondence between CORESETs or search space sets of the first cell and CORESETs or search space sets of the second cell.

It can be understood that the first device in FIG. 3 may perform the foregoing method embodiments with the same implementation principles and technical effects, and details are not described in this embodiment again.

Figure 4:
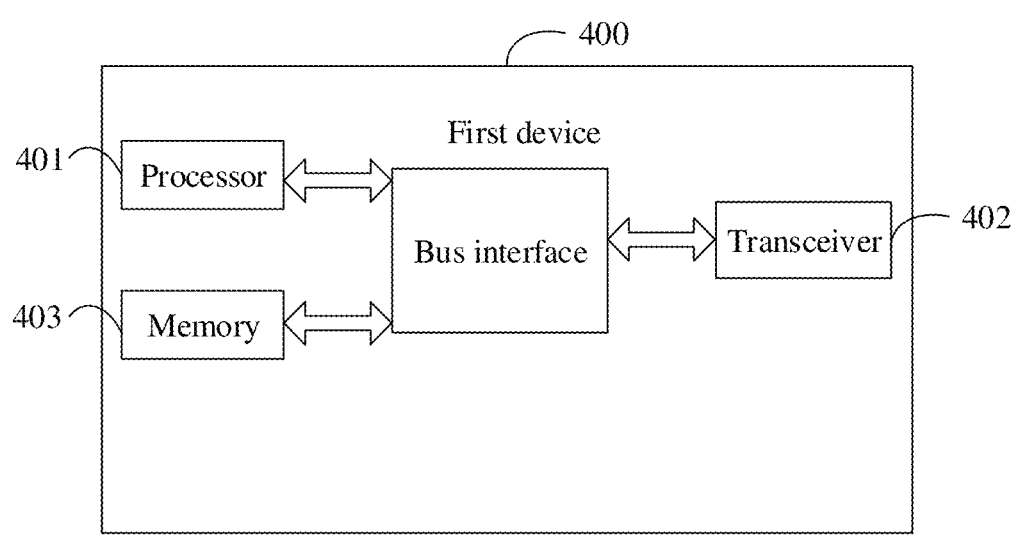
FIG. 4 is a second schematic structural diagram of a first device according to an embodiment of this disclosure.

Referring to FIG. 4, an embodiment of this disclosure provides another first device 400, including a processor 401, a transceiver 402, a memory 403, and a bus interface.

The processor 401 may be responsible for bus architecture management and general processing. The memory 403 may store data that the processor 401 uses when performing an operation.

In this embodiment of this disclosure, the first device 400 may further include a computer program that is stored in the memory 403 and capable of running on the processor 401. When the computer program is executed by the processor 401, the following is implemented: when configuration of a first cell does not include PDCCH configuration and configuration of a second cell includes only PDCCH configuration of the second cell, determining a PDCCH candidate quantity and/or a monitoring parameter of the first cell based on the PDCCH configuration of the second cell; or when configuration of a first cell does not include PDCCH configuration and PDCCH configuration of a second cell includes search space set configuration or PDCCH candidate quantity configuration of the first cell, determining a PDCCH candidate quantity and/or a monitoring parameter of the first cell based on the search space set configuration or the PDCCH candidate quantity configuration of the first cell; or when configuration of a first cell includes search space set configuration or PDCCH candidate quantity configuration of the first cell, determining a PDCCH candidate quantity and/or a monitoring parameter of the first cell based on the configuration of the first cell. The first cell is a cell that is cross-carrier scheduled by the second cell.

In FIG. 4, a bus architecture may include any quantity of interconnect buses and bridges, specifically for interconnecting various circuits of one or more processors represented by the processor 401 and a memory represented by the memory 403. The bus architecture may further interconnect various other circuits such as a peripheral device, a voltage regulator, and a power management circuit. These are all well known in the art, and therefore are not further described in this embodiment of this disclosure. The bus interface provides an interface. The transceiver 402 may be a plurality of components, that is, the transceiver 402 includes a transmitter and a receiver, and provides a unit for communicating with various other apparatuses on a transmission medium.

It can be understood that the first device in FIG. 4 may perform the foregoing method embodiments. Implementation principles and technical effects of the first device are similar to those in the foregoing method embodiments, and details are not described in this embodiment again.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form well known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any usable medium accessible to a general-purpose or special-purpose computer.

The objectives, technical solutions, and beneficial effects of this disclosure are further described in detail in the foregoing specific implementations. It should be understood that the foregoing descriptions are merely specific implementations of this disclosure, and are not intended to limit the protection scope of this disclosure. Any modification, equivalent replacement, improvement, or the like made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of this disclosure without departing from the spirit and scope of this disclosure. This disclosure is intended to cover these modifications and variations provided that they fall within the scope of protection defined by the following claims and their equivalent technologies of this disclosure.

What is claimed is:

1. A physical downlink control channel (PDCCH) candidate allocation method for cross-carrier scheduling, applied to a network-side device or a terminal, wherein the method comprises:
   when configuration of a first cell comprises search space set configuration or PDCCH candidate quantity configuration of the first cell, determining a PDCCH candidate quantity of the first cell, a monitoring parameter of the first cell, or the PDCCH candidate quantity and the monitoring parameter of the first cell based on the configuration of the first cell, wherein when the configuration of the first cell comprises the search space set configuration or the PDCCH candidate quantity configuration of the first cell, the search space set configuration or the PDCCH candidate quantity configuration of the first cell is used to indicate one or more of the following items: PDCCH search space set configuration or a PDCCH candidate quantity allocated to the first cell from a control resource set (CORESET) of the second cell; and a relationship between a search space set of the first cell and a CORESET or a search space set of the second cell; or
   when configuration of a first cell does not comprise PDCCH configuration and configuration of a second cell comprises only PDCCH configuration of the second cell, determining the PDCCH candidate quantity of the first cell, the monitoring parameter of the first cell, or the PDCCH candidate quantity and the monitoring parameter of the first cell based on the PDCCH configuration of the second cell; or
   when configuration of a first cell does not comprise PDCCH configuration and PDCCH configuration of a second cell comprises search space set configuration or PDCCH candidate quantity configuration of the first cell, determining the PDCCH candidate quantity of the first cell, the monitoring parameter of the first cell, or the PDCCH candidate quantity and the monitoring parameter of the first cell based on the search space set configuration or the PDCCH candidate quantity configuration of the first cell;
   wherein the first cell is a cell that is cross-carrier scheduled by the second cell.

2. The method according to claim 1, wherein the search space set configuration or the PDCCH candidate quantity configuration of the first cell is applied to some or all CORESETs or search space sets in an active bandwidth part (BWP) of the second cell.

3. The method according to claim 2, wherein that the search space set configuration or the PDCCH candidate quantity configuration of the first cell is applied to some or all CORESETs or search space sets in an active BWP of the second cell comprises any of the following items:
   search space set configuration or PDCCH candidate quantity configuration of each AL comprised in cross-carrier scheduling configuration of the first cell is applied to some or all CORESETs or search space sets in a BWP of the second cell; and
   search space set configuration or PDCCH candidate quantity configuration of each AL comprised in serving cell configuration of the first cell is applied to some or all CORESETs or search space sets in a BWP of the second cell.

4. The method according to claim 1, wherein
   BWP configuration of the first cell comprises: the search space set configuration of the first cell or PDCCH candidate quantity configuration of each aggregation level (AL) of the first cell, and a correspondence between CORESETs or search space sets of the first cell and CORESETs or search space sets of the second cell; or,
   the BWP configuration of the first cell comprises: the search space set configuration of the first cell or PDCCH candidate quantity configuration of each aggregation level (AL) of the first cell; or,
   the BWP configuration of the first cell comprises: a correspondence between CORESETs or search space sets of the first cell and CORESETs or search space sets of the second cell.

5. The method according to claim 1, wherein the determining the PDCCH candidate quantity of the first cell, the monitoring parameter of the first cell, or the PDCCH candidate quantity and the monitoring parameter of the first cell based on PDCCH configuration of the first cell comprises:
   when a search space set of the second cell is configured to monitor or perform blind detection for a third downlink control information (DCI) format, determining the PDCCH candidate quantity of the first cell, the monitoring parameter of the first cell, or the PDCCH candidate quantity and the monitoring parameter of the first cell based on the PDCCH configuration of the first cell, wherein
   the third DCI format comprises a carrier indicator field.

6. A terminal, comprising a processor, a memory, and a computer program that is stored in the memory and capable of running on the processor, wherein when the computer program is executed by the processor, a physical downlink control channel (PDCCH) candidate allocation method for cross-carrier scheduling is implemented, the method comprises:

when configuration of a first cell comprises search space set configuration or PDCCH candidate quantity configuration of the first cell, determining a PDCCH candidate quantity of the first cell, a monitoring parameter of the first cell, or the PDCCH candidate quantity and the monitoring parameter of the first cell based on the configuration of the first cell, wherein when the configuration of the first cell comprises the search space set configuration or the PDCCH candidate quantity configuration of the first cell, the search space set configuration or the PDCCH candidate quantity configuration of the first cell is used to indicate one or more of the following items: PDCCH search space set configuration or a PDCCH candidate quantity allocated to the first cell from a control resource set (CORESET) of the second cell; and a relationship between a search space set of the first cell and a CORESET or a search space set of the second cell; or when configuration of a first cell does not comprise PDCCH configuration and configuration of a second cell comprises only PDCCH configuration of the second cell, determining the PDCCH candidate quantity of the first cell, the monitoring parameter of the first cell, or the PDCCH candidate quantity and the monitoring parameter of the first cell based on the PDCCH configuration of the second cell; or when configuration of a first cell does not comprise PDCCH configuration and PDCCH configuration of a second cell comprises search space set configuration or PDCCH candidate quantity configuration of the first cell, determining the PDCCH candidate quantity of the first cell, the monitoring parameter of the first cell, or the PDCCH candidate quantity and the monitoring parameter of the first cell based on the search space set configuration or the PDCCH candidate quantity configuration of the first cell;

wherein the first cell is a cell that is cross-carrier scheduled by the second cell.

7. The terminal according to claim 6, wherein the search space set configuration or the PDCCH candidate quantity configuration of the first cell is applied to some or all CORESETs or search space sets in an active bandwidth part (BWP) of the second cell.

8. The terminal according to claim 7, wherein that the search space set configuration or the PDCCH candidate quantity configuration of the first cell is applied to some or all CORESETs or search space sets in an active BWP of the second cell comprises any of the following items:

search space set configuration or PDCCH candidate quantity configuration of each AL comprised in cross-carrier scheduling configuration of the first cell is applied to some or all CORESETs or search space sets in a BWP of the second cell; and search space set configuration or PDCCH candidate quantity configuration of each AL comprised in serving cell configuration of the first cell is applied to some or all CORESETs or search space sets in a BWP of the second cell.

9. The terminal according to claim 6, wherein

BWP configuration of the first cell comprises: the search space set configuration of the first cell or PDCCH candidate quantity configuration of each aggregation level (AL) of the first cell, and a correspondence between CORESETs or search space sets of the first cell and CORESETs or search space sets of the second cell; or, the BWP configuration of the first cell comprises: the search space set configuration of the first cell or PDCCH candidate quantity configuration of each aggregation level (AL) of the first cell; or, the BWP configuration of the first cell comprises: a correspondence between CORESETs or search space sets of the first cell and CORESETs or search space sets of the second cell.

10. The terminal according to claim 6, wherein the determining the PDCCH candidate quantity of the first cell, the monitoring parameter of the first cell, or the PDCCH candidate quantity and the monitoring parameter of the first cell based on PDCCH configuration of the first cell comprises:

when a search space set of the second cell is configured to monitor or perform blind detection for a third downlink control information (DCI) format, determining the PDCCH candidate quantity of the first cell, the monitoring parameter of the first cell, or the PDCCH candidate quantity and the monitoring parameter of the first cell based on the PDCCH configuration of the first cell, wherein the third DCI format comprises a carrier indicator field.

11. The terminal according to claim 6, wherein the determining the PDCCH candidate quantity of the first cell, the monitoring parameter of the first cell, or the PDCCH candidate quantity and the monitoring parameter of the first cell based on the PDCCH configuration of the second cell comprises:

when a search space set of the second cell is configured to monitor or perform blind detection for a first downlink control information (DCI) format, determining, based on a PDCCH candidate quantity configured for the second cell, a PDCCH candidate quantity to be allocated to each first cell, wherein the first DCI format comprises a carrier indicator field.

12. A network-side device, comprising a processor, a memory, and a computer program that is stored in the memory and capable of running on the processor, wherein when the computer program is executed by the processor, a physical downlink control channel (PDCCH) candidate allocation method for cross-carrier scheduling is implemented, the method comprises:

when configuration of a first cell comprises search space set configuration or PDCCH candidate quantity configuration of the first cell, determining a PDCCH candidate quantity of the first cell, a monitoring parameter of the first cell, or the PDCCH candidate quantity and the monitoring parameter of the first cell based on the configuration of the first cell, wherein when the configuration of the first cell comprises the search space set configuration or the PDCCH candidate quantity configuration of the first cell, the search space set configuration or the PDCCH candidate quantity configuration of the first cell is used to indicate one or more of the following items: PDCCH search space set configuration or a PDCCH candidate quantity allocated to the first cell from a control resource set (CORESET) of the second cell; and a relationship between a search space set of the first cell and a CORESET or a search space set of the second cell; or when configuration of a first cell does not comprise PDCCH configuration and configuration of a second cell comprises only PDCCH configuration of the second cell, determining the PDCCH candidate quantity of the first cell, the monitoring parameter of the first cell, or the PDCCH candidate quantity and the monitoring parameter of the first cell based on the PDCCH configuration of the second cell; or when configuration of a first cell does not comprise PDCCH configuration and PDCCH configuration of a second cell comprises search space set configuration or PDCCH candidate quantity configuration of the first cell, determining the PDCCH candidate quantity of the first cell, the monitoring parameter of the first cell, or the PDCCH candidate quantity and the monitoring parameter of the first cell based on the search space set configuration or the PDCCH candidate quantity configuration of the first cell;

wherein the first cell is a cell that is cross-carrier scheduled by the second cell.

13. The network-side device according to claim 12, wherein the search space set configuration or the PDCCH candidate quantity configuration of the first cell is applied to some or all CORESETs or search space sets in an active bandwidth part (BWP) of the second cell.

14. The network-side device according to claim 13, wherein that the search space set configuration or the PDCCH candidate quantity configuration of the first cell is applied to some or all CORESETs or search space sets in an active BWP of the second cell comprises any of the following items:

search space set configuration or PDCCH candidate quantity configuration of each AL comprised in cross-carrier scheduling configuration of the first cell is applied to some or all CORESETs or search space sets in a BWP of the second cell; and search space set configuration or PDCCH candidate quantity configuration of each AL comprised in serving cell configuration of the first cell is applied to some or all CORESETs or search space sets in a BWP of the second cell.

15. The network-side device according to claim 12, wherein

BWP configuration of the first cell comprises: the search space set configuration of the first cell or PDCCH candidate quantity configuration of each aggregation level (AL) of the first cell, and a correspondence between CORESETs or search space sets of the first cell and CORESETs or search space sets of the second cell; or, the BWP configuration of the first cell comprises: the search space set configuration of the first cell or PDCCH candidate quantity configuration of each aggregation level (AL) of the first cell; or, the BWP configuration of the first cell comprises: a correspondence between CORESETs or search space sets of the first cell and CORESETs or search space sets of the second cell.

16. The network-side device according to claim 12, wherein the determining the PDCCH candidate quantity of the first cell, the monitoring parameter of the first cell, or the PDCCH candidate quantity and the monitoring parameter of the first cell based on PDCCH configuration of the first cell comprises:

when a search space set of the second cell is configured to monitor or perform blind detection for a third downlink control information (DCI) format, determining the PDCCH candidate quantity of the first cell, the monitoring parameter of the first cell, or the PDCCH candidate quantity and the monitoring parameter of the first cell based on the PDCCH configuration of the first cell, wherein the third DCI format comprises a carrier indicator field.

17. A non-transitory computer-readable storage medium, wherein the computer-readable storage medium stores a computer program, and when the computer program is executed by a processor of a network-side device or a terminal, a PDCCH candidate allocation method for cross-carrier scheduling is performed, the method comprising:

when configuration of a first cell comprises search space set configuration or PDCCH candidate quantity configuration of the first cell, determining a PDCCH candidate quantity of the first cell, a monitoring parameter of the first cell, or the PDCCH candidate quantity and the monitoring parameter of the first cell based on the configuration of the first cell, wherein when the configuration of the first cell comprises the search space set configuration or the PDCCH candidate quantity configuration of the first cell, the search space set configuration or the PDCCH candidate quantity configuration of the first cell is used to indicate one or more of the following items: PDCCH search space set configuration or a PDCCH candidate quantity allocated to the first cell from a control resource set (CORESET) of the second cell; and a relationship between a search space set of the first cell and a CORESET or a search space set of the second cell; or when configuration of a first cell does not comprise PDCCH configuration and configuration of a second cell comprises only PDCCH configuration of the second cell, determining the PDCCH candidate quantity of the first cell, the monitoring parameter of the first cell, or the PDCCH candidate quantity and the monitoring parameter of the first cell based on the PDCCH configuration of the second cell; or when configuration of a first cell does not comprise PDCCH configuration and PDCCH configuration of a second cell comprises search space set configuration or PDCCH candidate quantity configuration of the first cell, determining the PDCCH candidate quantity of the first cell, the monitoring parameter of the first cell, or the PDCCH candidate quantity and the monitoring parameter of the first cell based on the search space set configuration or the PDCCH candidate quantity configuration of the first cell; wherein the first cell is a cell that is cross-carrier scheduled by the second cell.

* * * * *